(12) United States Patent
Pry

(10) Patent No.: US 7,627,826 B2
(45) Date of Patent: *Dec. 1, 2009

(54) SYSTEM FOR ORGANIZATION, DISPLAY, AND NAVIGATION OF DIGITAL INFORMATION

(75) Inventor: Matthew Pry, Bucyrus, OH (US)

(73) Assignee: Third Generation Search, Ltd, Bucyrus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,690

(22) Filed: Jun. 2, 2008

(65) Prior Publication Data

US 2008/0276185 A1  Nov. 6, 2008

Related U.S. Application Data

(63) Continuation of application No. 10/940,290, filed on Sep. 13, 2004, now Pat. No. 7,383,510.

(51) Int. Cl.
*G06F 3/00* (2006.01)
*G06F 3/048* (2006.01)

(52) U.S. Cl. .................. 715/745; 715/786; 715/811

(58) Field of Classification Search ............... 715/745, 715/786, 811, 738, 838, 854, 781; 707/3, 707/4

See application file for complete search history.

(56) References Cited

U.S. PATENT DOCUMENTS

| | | | |
|---|---|---|---|
| 6,070,176 A | 5/2000 | Downs et al. | |
| 6,271,840 B1 | 8/2001 | Finseth et al. | |
| 6,275,829 B1 | 8/2001 | Angiulo et al. | |
| 6,356,908 B1 | 3/2002 | Brown et al. | |
| 6,513,035 B1 | 1/2003 | Tanaka et al. | |
| 6,643,641 B1 | 11/2003 | Snyder | |
| 2003/0014415 A1 | 1/2003 | Weiss et al. | |
| 2004/0001104 A1 | 1/2004 | Sommerer et al. | |
| 2005/0132018 A1 | 6/2005 | Milic-Frayling et al. | |
| 2005/0257400 A1 | 11/2005 | Sommerer et al. | |

OTHER PUBLICATIONS

Smartdevil, "Thumbshots," Millions of Web Surfers Flocking for Thumbshot Previews, pp. 1-2, Feb. 11, 2004, two pages, http://www.smartdevil.com/corporate/press/20040211-1.pxf.

(Continued)

*Primary Examiner*—Weilun Lo
*Assistant Examiner*—Truc T Chuong
(74) *Attorney, Agent, or Firm*—Standley Law Group LLP

(57) ABSTRACT

A system and method for the organization, display, and navigation of digital information. The system allows for the easy navigation of a primary source of information, as well as the navigation of secondary information related to the primary information source. The system may be used to organize, display, or navigate any type of digital information, but is primarily intended to be used to organize, display, or navigate the results of a web based search engine. Primary source information is displayed in a search results window while secondary information is displayed in an operational window. The primary source information may be displayed as thumbnail images of web pages that satisfy a search request. The user may scroll through the thumbnail images of the web pages of the primary information source and navigate web pages of interest in the operational window.

27 Claims, 9 Drawing Sheets

OTHER PUBLICATIONS dmoz, open directory project, "Previews by Thumbshots™," Top: Recreation: Pets: Dogs: Breeds: Terrier Group: West Highland White Terrier, pp. 1-3, Sep. 5, 2003, three pages, http://open.thumbshots.org/Recreation/:ets/Dogs/Breeds/Terrier_Group/West_Highland_W....

Smartdevil, "Thumbshots," Free Thumbshots for DMOZ Directory, pp. 1-2, Mar. 5, 2004, two pages, http://thumbshots.org.

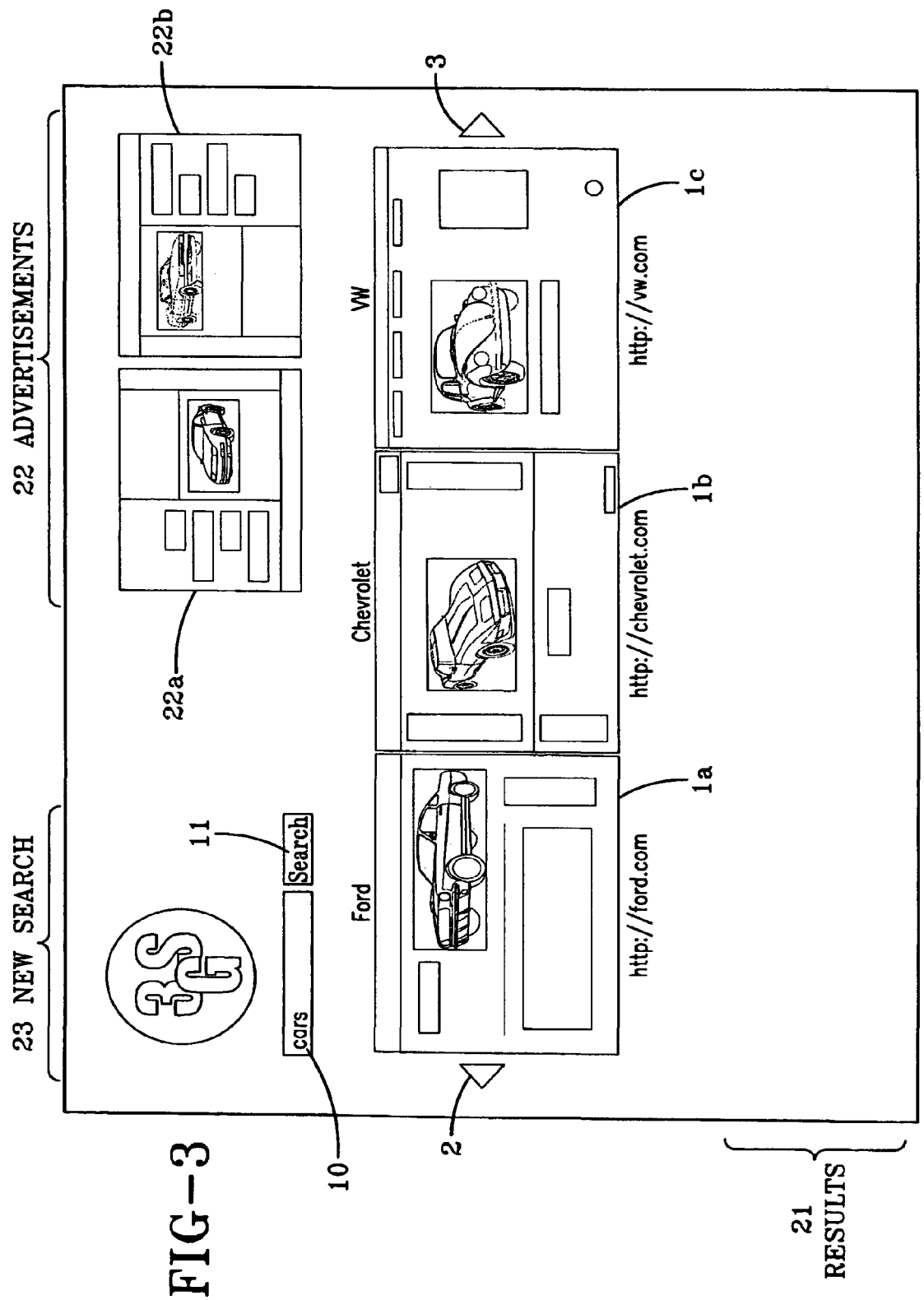

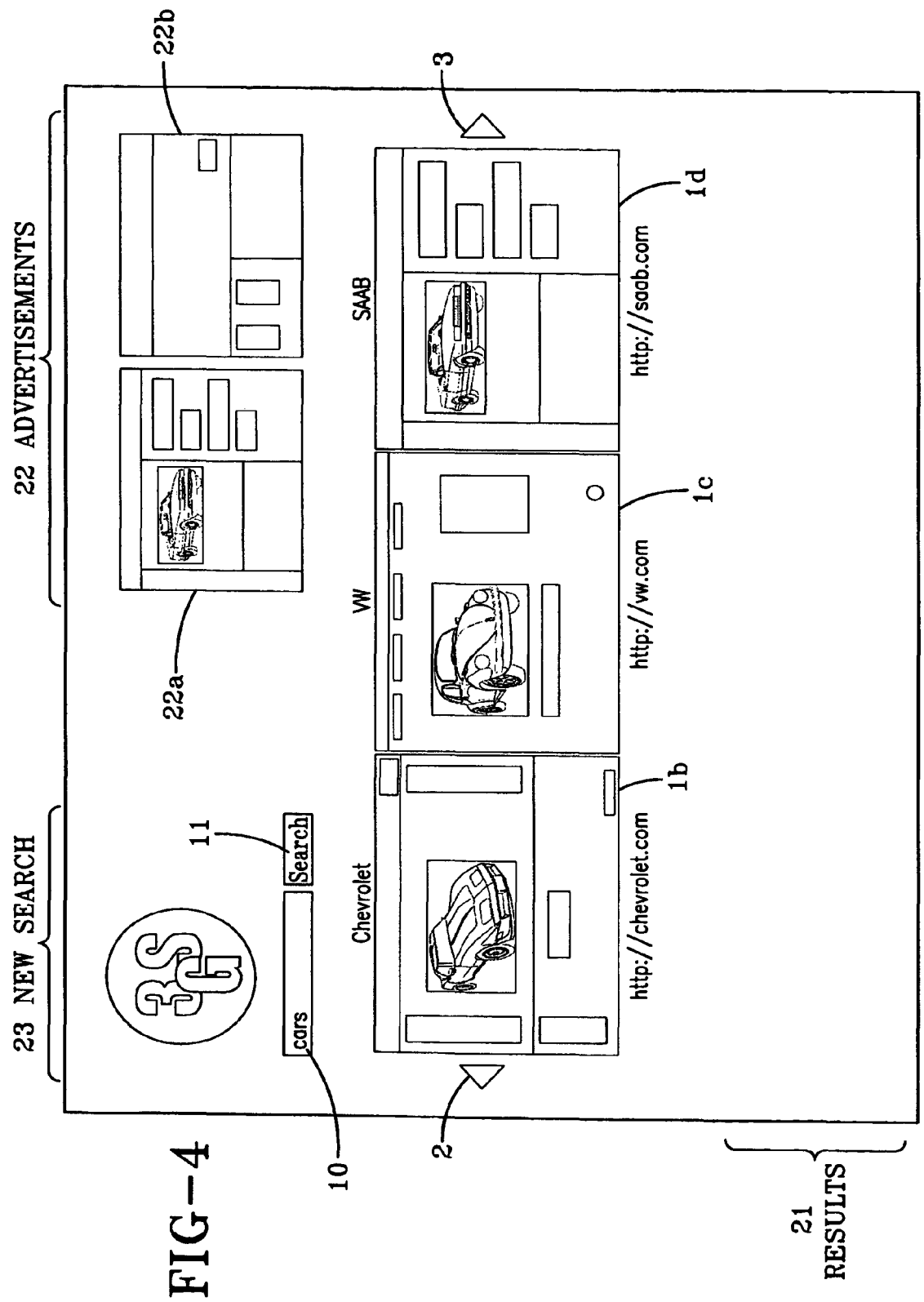

SYSTEM FOR ORGANIZATION, DISPLAY, AND NAVIGATION OF DIGITAL INFORMATION

CROSS-REFERENCES TO RELATED APPLICATIONS

This application is a continuation of U.S. application Ser. No. 10/940,290 filed Sep. 13, 2004, titled SYSTEM FOR ORGANIZATION, DISPLAY, AND NAVIGATION OF DIGITAL INFORMATION, now U.S. Pat. No. 7,383,510, issued Jun. 3, 2008.

FIELD OF INVENTION

The present invention relates generally to systems and methods for the organizing, displaying, and navigating digital information. In particular, the present system allows for the easy navigation of primary sources of information, as well as the navigation of secondary information embedded in the primary information sources.

BACKGROUND OF THE INVENTION

A web based search engine is a common tool employed by users of the internet to find and explore web based content. A user enters search terms into a search engine, and the search engine finds relevant web pages based upon the specified criteria. Once the relevant web pages are found, the search engine displays the search results to the user. Typically, the user is provided with a list of links to web pages with relevant information and text based excerpts of the content at the linked web page. A second method of displaying search engine results uses "thumbnail" images of the content of individual web pages, displayed in conjunction with the link to the web page and associate text excerpt. A thumbnail image of web page content is a miniaturized picture of content from the HTML page at the corresponding URL.

SUMMARY OF THE INVENTION

The present invention offers a new and unique method of organizing and displaying web based search engine results, allowing the user to navigate the search engine results in a more expedient and efficient manner. After an internet search has been performed, the present system displays results in thumbnail image form (typically two or more). These thumbnail images of web pages that match the search criteria are displayed in a horizontal row across the user's screen, with each thumbnail being large enough so that the user may review information at each corresponding web page. By selecting the thumbnails the user may view the corresponding web pages, or the user may navigate the remainder of the search results by selecting a right shift button. The initial select of the right shift button shifts each of the thumbnails to the left and another thumbnail appears on the right side of the screen in horizontal alignment with the other thumbnails.

After the initial select of the right shift button, thumbnail images appear in a horizontal alignment on the screen. Another select of the right shift button shifts the leftmost thumbnail off of the screen, and a new search result thumbnail enters the screen from the right. The thumbnails shown on the screen are again aligned horizontally. At this point a left shift arrow button appears on the left side of the screen. A select of the left shift arrow button shifts the thumbnails to the right, pushing the rightmost thumbnail off of the screen and placing the previously viewed thumbnail in the right most position. The user may navigate the search result thumbnails by selecting the right or left shift buttons.

If a user finds a particular search result thumbnail which is believed to contain relevant information, the present invention allows for the user to search the content of the corresponding web page without disrupting the search results. Selecting the thumbnail image (e.g., by double clicking) opens a separate browser window with the corresponding web page. This separate browser window, referred to as the operational window, is placed in front of the original search window and formatted to a size that allows the user to view the entire operational window while simultaneously viewing a portion of the original search window.

The user is then free to navigate the operational window. While the user navigates the operational window, a smaller thumbnail image of the web page which the user selected to open in the operational window appears below the horizontally aligned search results in the original search window. Additional thumbnail images of web pages selected by the user appear below the original search results in the order of the user's selections. The user therefore, is able to determine quickly which web pages from the original search results were visited.

After a user has opened an operational window, the user may return to the original search window by selecting the original search window or closing the operational window. As mentioned previously, the operational window is formatted such that while the operational window is in front of the original search window, a portion of the original search window still remains visible. This arrangement allows for the user to easily return to the original search window.

The present invention provides a more efficient and dynamic display method for viewing and navigating the results of an internet based search engine. By using the right and left shift buttons, the user may navigate the different web page results of the search. By selecting one of the thumbnails the user is allowed to search the information embedded in each of these web pages without disrupting the searching process.

BRIEF DESCRIPTION OF THE DRAWINGS

FIGS. 2-4 are screen displays comprising search results according to an example embodiment of the present invention;

DETAILED DESCRIPTION OF THE INVENTION

The following description details an example embodiment of the present invention. The present invention provides a new method in which digital information may be organized, displayed, and navigated. The present invention may be used in conjunction with any type of digital information, but is intended primarily to be used for the purpose of displaying the results of an internet based search engine. By describing this example use, it is not to be implied that the present invention may not be used to organize, display, or navigate other types of digital information.

In an example embodiment, the present invention is a website based on the commercially popular Macromedia Flash program. For the purposes of describing the example embodiment, the present invention operates in conjunction with a search engine that provides a sequence of multiple relevant web pages in response to a search request. For further purposes of this description, this sequence is referred to as the primary search results.

Figure 1:
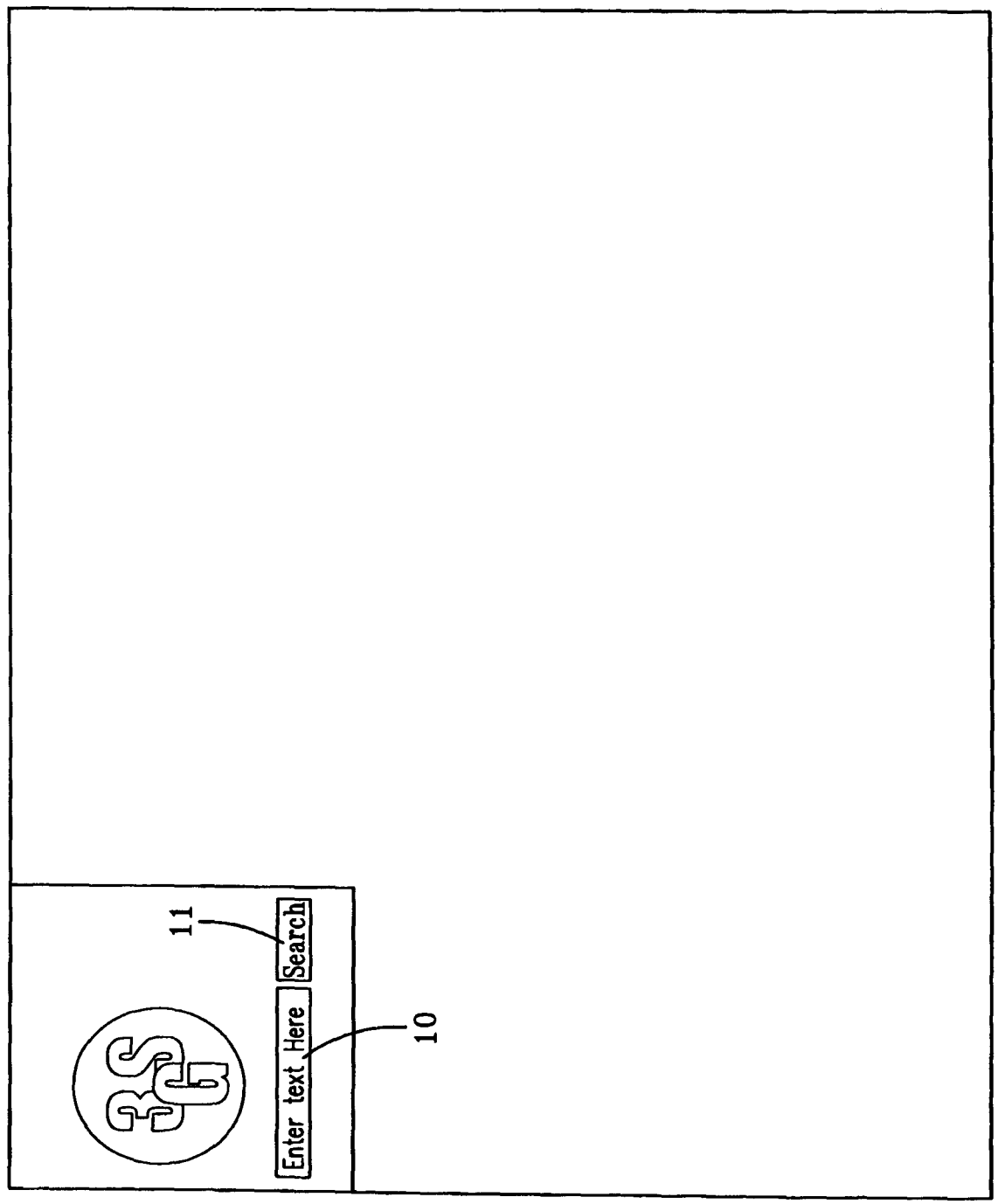
FIG. 1 is an initial screen display according to an example embodiment of the present invention.

To use the example embodiment of the present invention, a user first visits the web page containing the web based search engine which employs the present invention. An exemplary initial web page may be seen in FIG. 1. Upon visiting the particular web page in question, the user is presented with a text box 10. The web page may also contain content in addition to the text box 10, including but not limited to: advertisements, links to other web pages, trademarks and trade names, news headlines or any other relevant information. The user enters search terms into the text box 10, and upon selecting a search activation button 11, the search engine generates the primary search results.

There are several means by which the primary search results may be generated. However, in the example embodiment the search results are generated by the following method. Search items returned are found by the keywords which the user enters and are returned in the following order: conjoined search words found in the site description, top-level categories that match the search words, meta-tags (site keywords) that match the search words, any search words found within the site description, and URL titles that contain any of the search words.

The search engine gives first priority to conjoined search words which are found in the site description. A search using the search terms "cars and trucks" first finds web pages that contain the entire string "cars and trucks" together somewhere within the page description. Using PHP, the user input is compared to strings within a MySQL database. The following code may be used:

$sql="select * from searchData where LOWER(site_description) like LOWER(%'$user_input'%)".

The use of the word "LOWER" may be used to convert a string to lower case so the site search is not restricted to only upper case wording.

After first searching for instances of conjoined strings, the search engine gives priority to category searches. Using the previous example, "cars and trucks" may not be a category, but "cars" and "trucks" may be individually categorized in the database. The PHP code parses the string into individual words and completes a word-by-word comparison. The comparison is done by splitting the user string, delimited by spaces, and then cross-referencing the split string with the category section of the search database. So "cars and trucks" becomes "cars," "and," and "trucks."

A program loop is created so that while there are more items in an array, the loop continues. The search engine first checks for "cars" within the category column of the search table. If it is there, it is added to the result. The term "and" is skipped because it is an article. The search engine then searches within the category column of the search table for "trucks." Such a process is repeated for each search term.

The search engine next searches for meta-tags (site keywords) that match the search terms. Most websites use meta-tags in order to describe their sites via keywords. In this process the user string is parsed and the search is conducted for each individual term in the aforementioned manner. The search engine finally searches for any search words found within the site description. These descriptions are searched in the same manner as the meta tags. Each site has a corresponding site description in the MySQL database in the "site-Search" column. This text-column is searchable, and it is searched for the search terms. If a match is found, the image for that site is retrieved and "echoed" out into the PHP code. Finally, URL titles that contain any of the search words are located.

The present invention may be implemented using a Macromedia Flash website. When the search is conducted, the search engine returns a result for each of the five search criteria columns. Each individual result is either true if there is a match, or null if there is no match. Results are sent to searchPage.php, which contains MySQL code to call to a database comprising images for the web pages. If there is a match, the URL and image file for the result are returned and echoed to the PHP code as follows:

MySQL statement="select * from searchTable where siteDescriptioin='$userInput'";
If(MySQL) // if there is a result, do something
{$imageFile=$row['imageFile']; $url=$row['url']; // now echo this info out echo("&imageFile=$imageFile&"); // the ampersands are there so flash can spot them and pull the resulting image file and url in}
Flash is designed to read external file variables starting with the ampersand. "$imageFile" is a PHP variable, so if the image file from the SQL database equals "images/mytruckPic.gif", then $imageFile="images/mytruck.gif". So, using the above example, the actual searchPage.php would look in a browser like "&imageFile=images/mytruckPic.gif." This result is triggered by the user inputting text into the search field on the flash page. The flash page, when the submit or search activation button is selected, then posts the user submitted data to the searchPage.php. The resulting searchPage.php is read back into flash in order to create the picture array that the user sees as a URL preview. Flash uses the following code to pick up the image names from the PHP:

```
for (i=0; i<10; i++) {
    urlSite = eval("_root.urlVar"+i);
    urlImage = eval("_root.imageVar"+i);
    urlTitle = eval("_root.titleVar"+i);
    loadMovie(urlImage, "scroll.result01.loader");
        _root.urlTest.text = urlImage;
}
function loadURL ( ) {
    getURL(_root.resultLoader.urlSite, "_blank");
}
stop( );
```

Now that flash has the resulting images from the PHP, it can display the images onto the interface screen.

Figure 2:
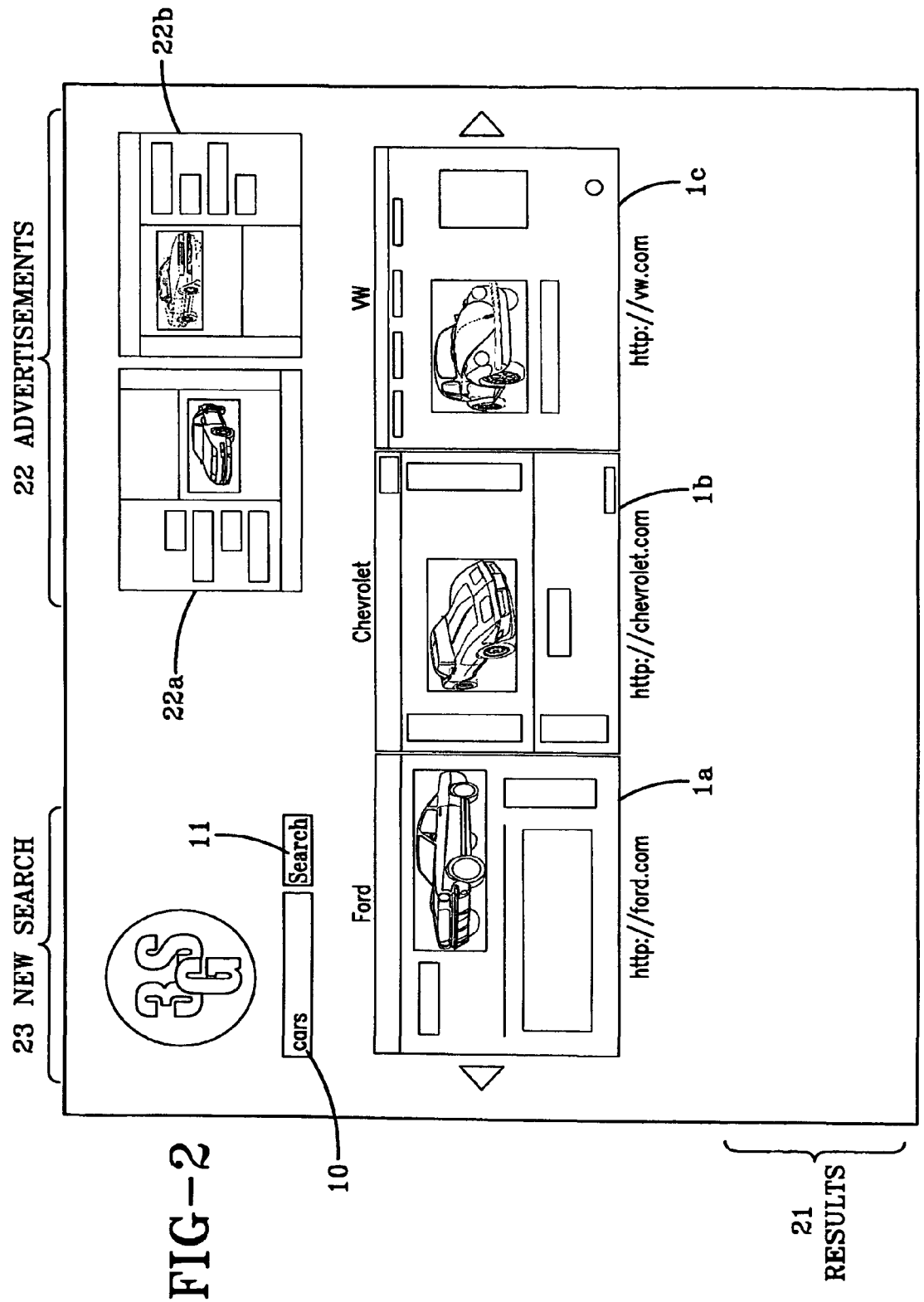

Upon the execution of the search the user is presented with a new screen, as seen in FIG. 2. The new screen, referred to as the search results screen, consists of a results section 21, an advertisement section 22 and a new search segment 23. However, this is not intended to limit the scope of the present invention, as the search result screen may include additional sections. In the example embodiment the new search segment 23 comprises a text box 10 and a search activation button 11. The search segment 23 may also contain a spell check feature, which checks the search terms for proper spelling. At any time during the use of the present invention, the user may enter new search terms into the text box 10 and activate a new search by selecting the search activation button 11. If a new search is conducted at any time, a new search result screen, as seen and described in FIG. 2, is displayed for the new primary search results.

The advertisement section 22 of the search result screen, in the example embodiment, contains two separate rectangular advertisements 22a and 22b aligned horizontally in the upper right hand portion of the web browser. The individual advertisements 22a and 22b may consist of any desirable content, but are generally commercial in nature. As a feature of the example embodiment, if the user selects one of the advertisements 22a or 22b, he is redirected to a web page linked to the advertisement.

The results section 21 of the search result screen covers approximately the bottom two-thirds of the web browser in the example embodiment. A primary data set comprising a plurality of individual data segments (e.g., thumbnail images of web pages) is displayed in this section. As shown in FIG. 2, the primary search results are displayed in the results section in thumbnail form 1a, 1b, and 1c with each thumbnail 1a, 1b, and 1c representing an individual web page from the primary search results. When a search is conducted, the results section 21 of the search result screen initially displays thumbnail images 1a, 1b, and 1c aligned horizontally, as seen in FIG. 2. As shown in FIG. 2, in an example embodiment of the present invention, three thumbnails 1a, 1b, and 1c are aligned in a horizontal row in the middle of the screen.

Referring to FIG. 3, a scrolling function implemented with right and left shift buttons may be used to view the individual data segments of the primary data set. A left shift button 2 and a right shift button 3 are used to scroll the search results. If after receiving three thumbnails 1a, 1b, and 1c the user selects this right shift button 3, the three thumbnail images 1a, 1b, and 1c in FIG. 3 will be shifted to the left and another thumbnail image will be placed in the rightmost position of the row. This row of three thumbnail images 1a, 1b, and 1c as seen in FIG. 3, with one thumbnail 1a in the left third of the horizontal axis, one thumbnail 1b in the central third of the horizontal axis, and another thumbnail 1c in the right third of the horizontal axis, changes as the users selects the scroll or shift buttons 2, 3. As the right shift button 3 is selected, the leftmost thumbnail image 1a is shifted off of the screen, the center 1b and rightmost 1c thumbnails are shifted to the leftmost and central positions, respectively, and a new thumbnail image 1d appears in the rightmost position, as seen in FIG. 4. As the user continues to select the right shift button 3, the leftmost thumbnail image is shifted off of the screen and a new thumbnail image is placed in the rightmost position.

At the point that the first thumbnail image is shifted off of the right side of the screen, the left shift 2 button appears on the left side of the screen. When the user selects the left shift button 2, the rightmost image 1d is shifted off of the screen, the center 1c and leftmost 1b thumbnail images are shifted to the rightmost and center positions, respectively, and the last image to be shifted off the right hand side of the screen 1a appears in the left most position. Thus, by using the right shift 3 and left shift buttons 2, the user may navigate the thumbnail images 1 of the primary search results.

The individual advertisements 22a, 22b appearing in the advertisement section 22 may move in cohesion with the search result list. For example, every time the user clicks on the right arrow to move the search result list one thumbnail to the left, the advertisement thumbnails also move one thumbnail to the left. The advertisements may be drawn from a separate table set up similar to the horizontal search result list.

In order to facilitate the user's ability to quickly and efficiently navigate the thumbnail images 1, the web browser loads more images than are shown on the screen. After conducting an initial search, the web browser downloads approximately the first 20 thumbnails 1, while only displaying only a subset (e.g., the first three 1a, 1b, and 1c). As the user shifts the images 1 to the left, the browser maintains a minimum number of thumbnail images 1 to the right and to the left of the displayed images. As there are more and more images 1 shifted to the left, the images 1 to the far right are replaced and new images 1 are downloaded.

Figure 5A:
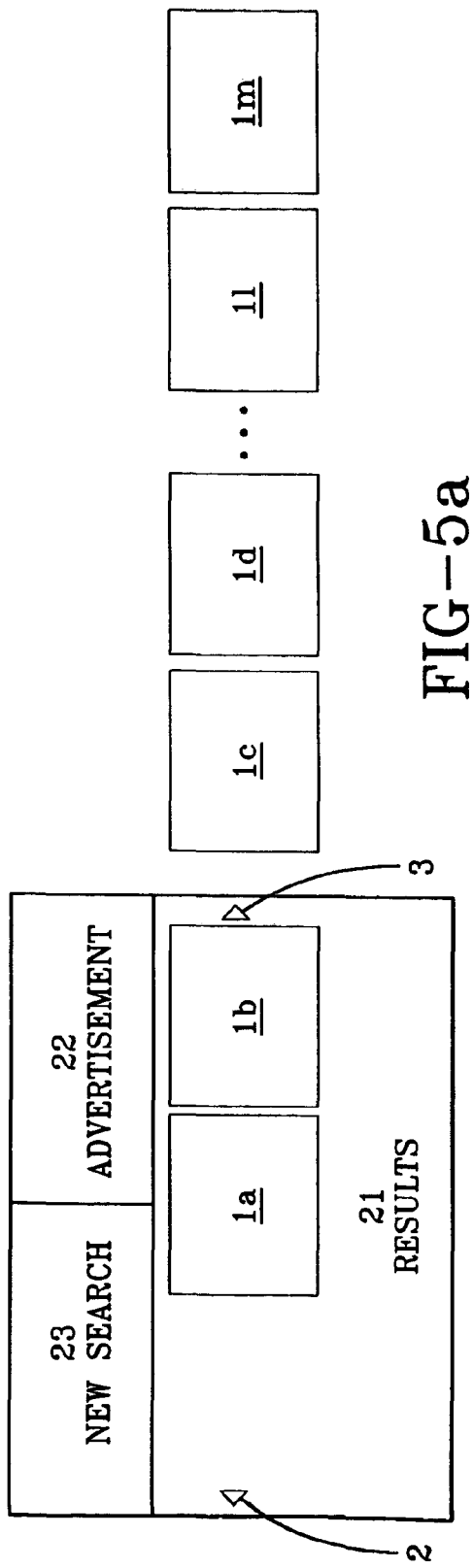
FIGS. 5a-5d are screen displays illustrating the presentation of search results according to an example embodiment of the present invention.
Figure 5B:
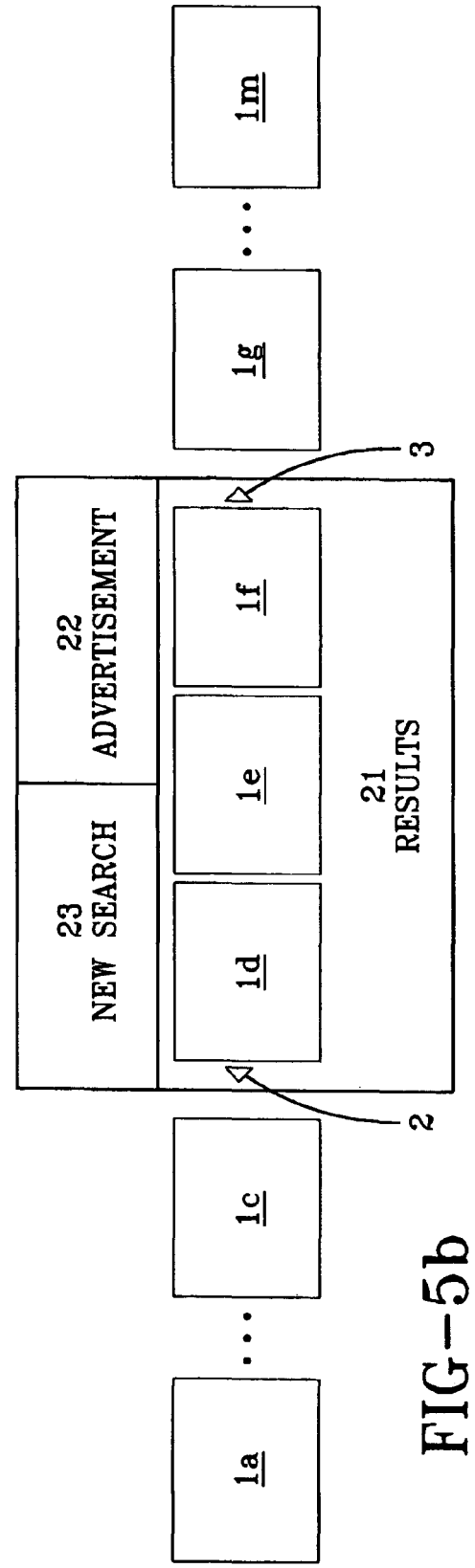

An example may be demonstrated by FIG. 5a, in which this process is described with the browser maintaining a minimum of five images 1 on the right and left of the displayed images. FIG. 5a shows the initial search results, in which 13 thumbnail images 1a, 1b, . . . 1m are initially downloaded. The first two thumbnail images 1a and 1b are displayed on the screen and the 11 sequential images 1c . . . 1m are downloaded but not displayed on the screen. FIG. 5b shows an intermediate stage where the user has selected the right shift button 3 four times. As can be seen, images 1a, 1b, and 1c are not displayed on the screen, but are saved. These images 1a, 1b, and 1c which have been displayed in the results section 21 and then shifted off of the screen using the right shift button 3, are the images which are referred to as the images saved to the left of the display area. Images 1d, 1e, and 1f are displayed in the results section 21. Images 1g . . . 1m are not displayed on the screen, but are saved by the browser. These images—which are not displayed in the display area, but will enter the display area by selecting the right shift button 3 a sufficient number of times—are the images which are referred to as the images saved to the right of the display area.

Figure 5C:
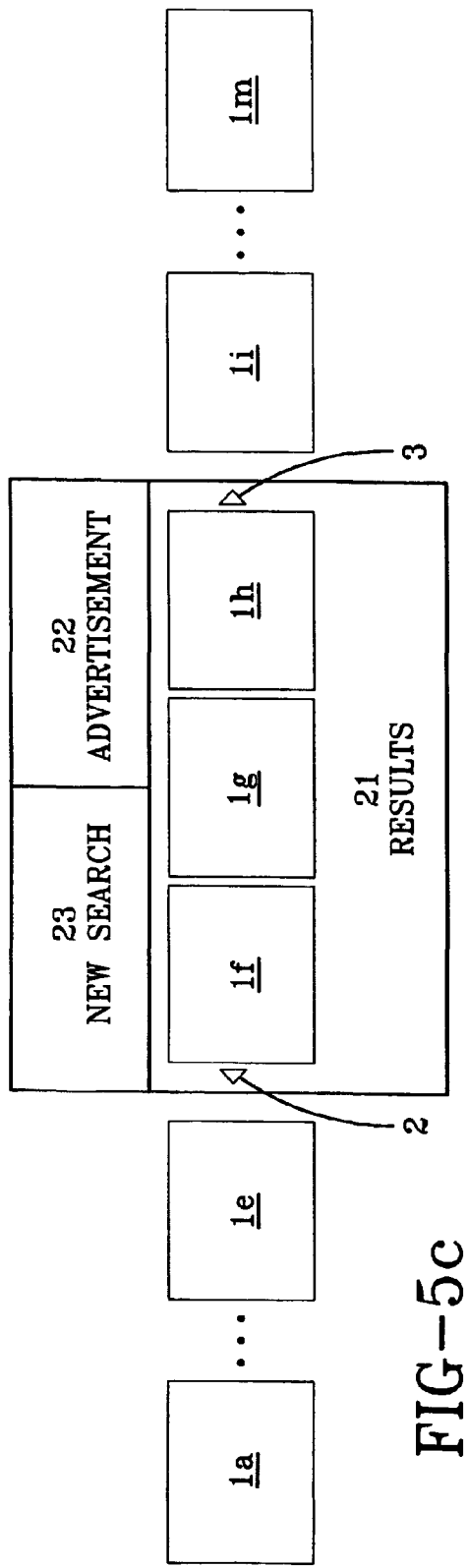
Figure 5D:
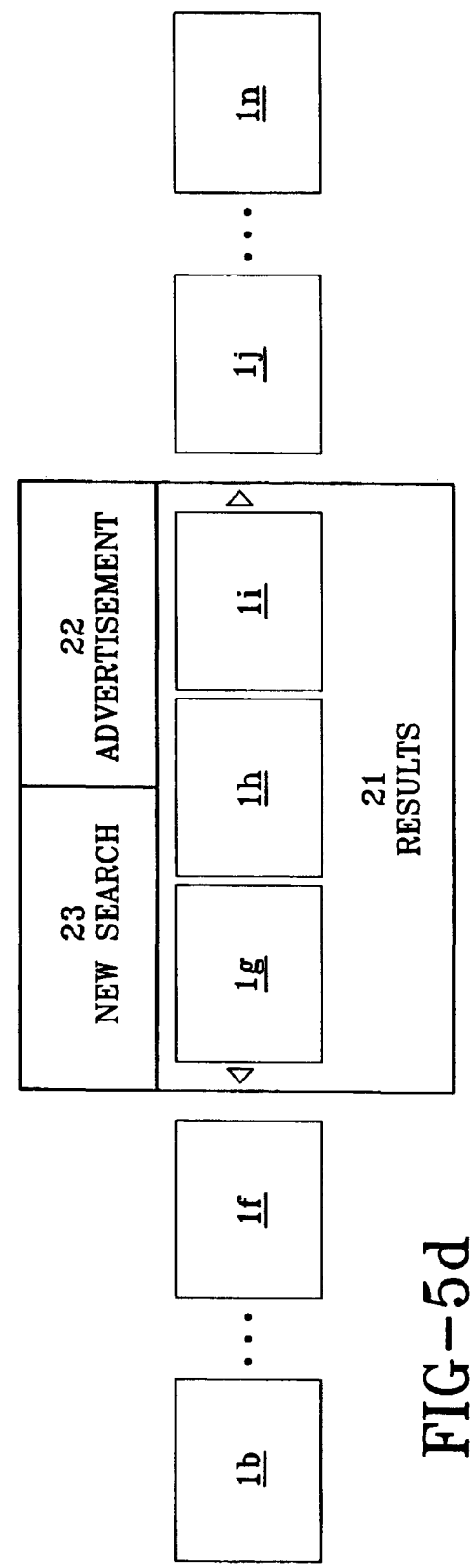

FIG. 5c shows the process after two more right button selections, with images 1a . . . 1e saved as to the left of the display area, images 1f, 1g, and 1h displayed in the results section 21, and images 1i . . . 1m saved as to the right of the screen. Once the images have been shifted to the left a sufficient number of times so there are five images on each side of the screen, a subsequent left shift of the images (using the right shift button) requires the browser to download a new image to the right of the screen and to discard an image to the left of the screen. This result may be seen in FIG. 5d where image 1a has been discarded and image 1n has been downloaded. If at this point the user shifts the images to the right (using the left shift button), a similar but opposite process of downloading an image to the left of the screen 1a and discarding an image to the right of the screen 1n occurs.

The advantage of this process is that it allows for the user to quickly browse the thumbnail images 1 of the primary search results. This result occurs because the images 1 to the right or left of the screen may easily be shifted to the screen, while the browser downloads the replacement the images to the right or left of the display area. While the previous example uses 13 thumbnail images, this number is in no way intended to be limiting. Any number of images could be used, and the optimal number of images depends on the memory of the web browser, the download speed, and the size of the thumbnail images.

Figure 6:
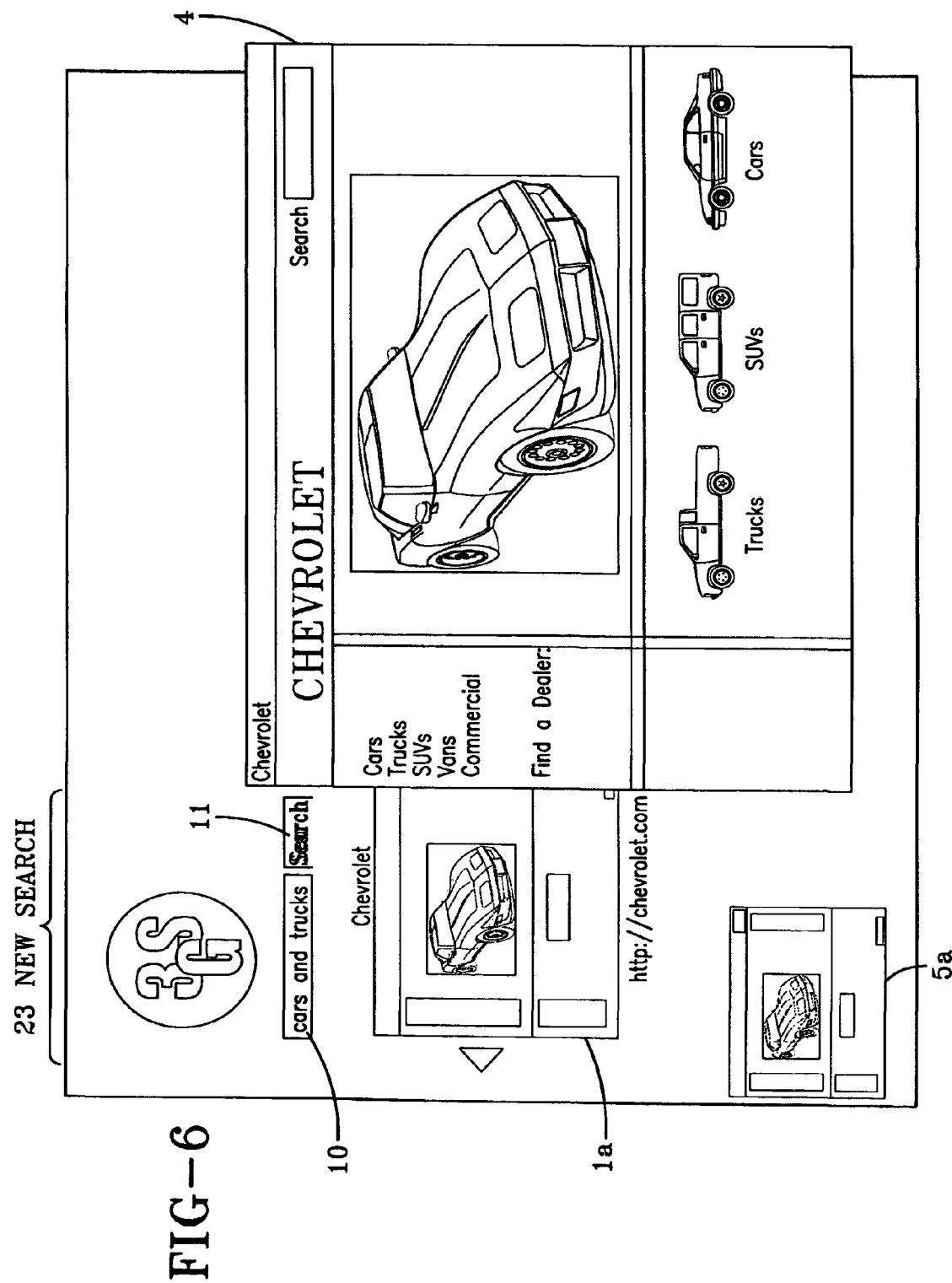
FIG. 6 is a screen display of an operational window according to an example embodiment of the present invention.

The user may browse the primary search results by using the right 3 and left 2 shift buttons (shown as arrows). When the user finds a thumbnail image 1 that he believes may be relevant to the search criteria, he may view this web page in real time by selecting the thumbnail image 1 (e.g., by double clicking on it). When the user selects the thumbnail image 1 (e.g., by double clicking on it), the corresponding web page is opened in a new web browser, which is referred to as the operational window 4. The operational window 4 opens to a size that allows the page to be viewed but also allows the user access to the original search window, as seen in FIG. 6. This size is the original size of the operational window 4 although the size may be adjusted as any other web browser window.

The operational window 4 allows the user to explore secondary information embedded in each of the individual data segments of primary data set (i.e., the content of the web page) in the same manner as any other web page. The user may scroll through the web page and may also select links to other web pages. The link to the web page from the primary search results is used to open the operational window and each web page that user selects from the original search window is recorded. This history is referred to as the secondary search results, and each of the selected web pages is displayed in thumbnail form in the search result window, below the primary search results. As shown in FIG. 6, the user's selection of thumbnail image 1a results in the display of the same image 5a just below the primary search results.

As the operational window 4 is in front of the original search result window, the user navigates the operational window 4 as he would any other web browser window. The user may easily return to the search result window to the front of the screen by either minimizing the operational window 4 or by selecting on the dead space of the search result window.

The secondary search results are stored in a temporary database table. When an image is selected from the primary search results, the URL and corresponding thumbnail image is saved into the temporary database table. The URLs and thumbnail images are then provided to the flash code so that the secondary search results may be displayed and reviewed by the user. The thumbnail images and URLs of the secondary search results are provided to the flash code in the same manner as the primary search results. The only difference is that the thumbnail images and URLs are retrieved from a different MySQL table. Therefore, the PHP also holds the code:

MySQLstatement="select   *   from   userTempTable 10023408";

where "UserTempTable" is concatenated with a session variable. In the above example, the session number is 10023408, which is a number assigned by the web server. The table "userTempTable+session variable" is created as soon as the website of the present invention is opened.

The table is populated based on the web pages selected from the search results window. If the user searches "cars and trucks" and "chevrolet.com" appears in the primary search results and the user selects the corresponding thumbnail image, the "chevrolet.com" image is inserted into the database table.

MySQLstatement="insert into userTempTable10023408 values('chevrolet.com', 'chevrolet Image.gif')";

The image "chevroletImage.gif" now appears in the history of the secondary search results which appear below the primary search results. Every subsequent selection of a thumbnail image from the primary search results has the same effect, so the secondary search results continue to grow.

In an example embodiment of the present invention there is one operational window 4. When the user opens a web page from the primary search results, it appears in the operational window 4. The user may then create secondary search results from the primary search result web pages that are selected.

Figure 7:
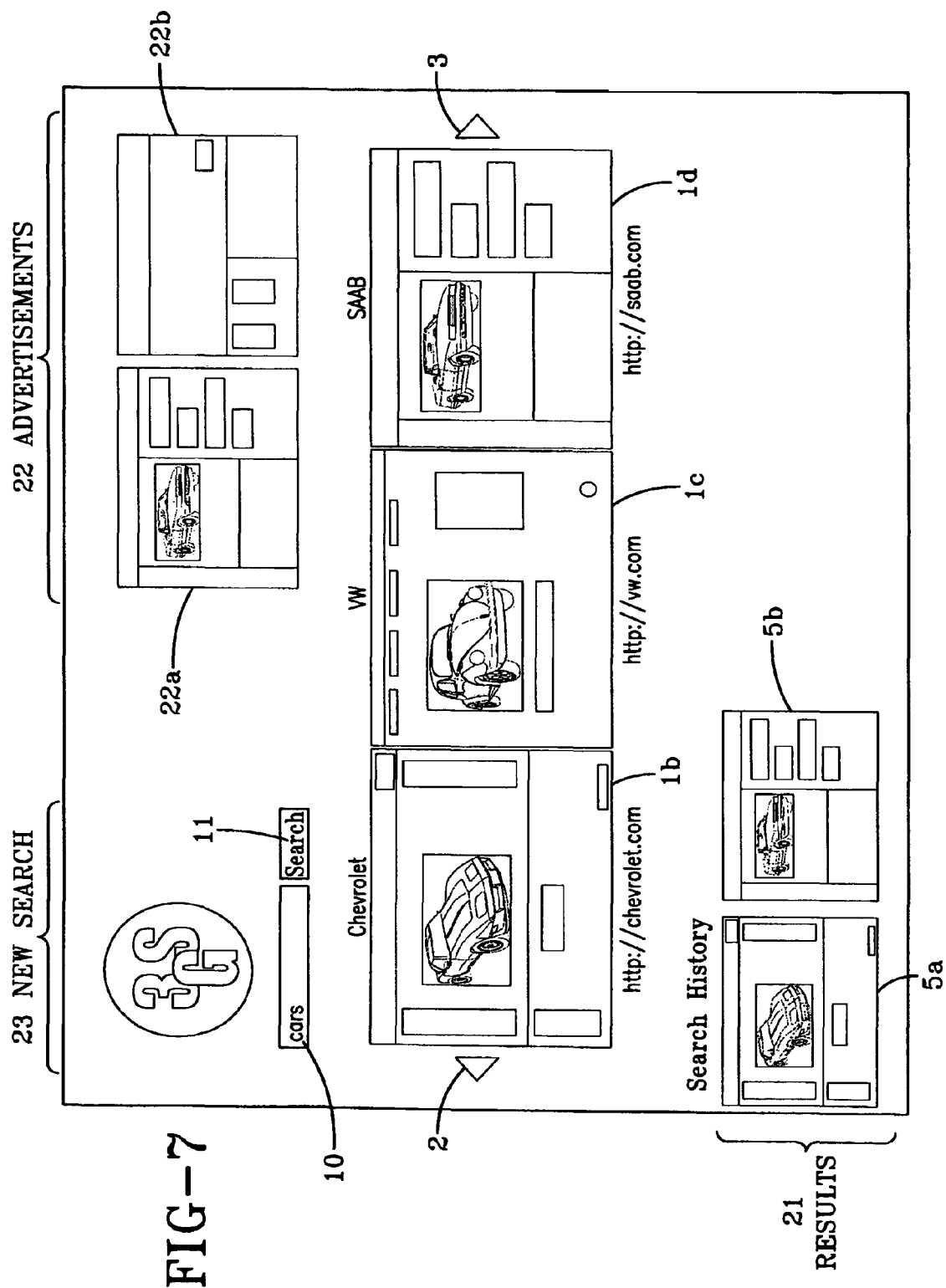
FIG. 7 is a screen displays illustrating the presentation of secondary search results according to an example embodiment of the present invention.

FIG. 7 illustrates the presentation of secondary search results according to an example embodiment of the present invention. Secondary search results 5 appear as thumbnail images below the primary search results and reflect the order in which selections from the primary search results are made by the user. For example, if the user visits the web page of image 1b and then 1d, then a smaller image of web page 1b is displayed first 5a and a smaller image of web page 1d is displayed second 5b. While reviewing the primary search results, the user may decide to visit only a few of the many of web pages associated with the search results. The secondary search results section 5 of the display allows the user to determine quickly which web pages were visited during the session. If the user visits more web pages than may be displayed on the screen, left and right shift buttons may be added on either side of the secondary search results row so that the user may scroll through the secondary search results in a manner similar to the primary search results.

Figure 8:
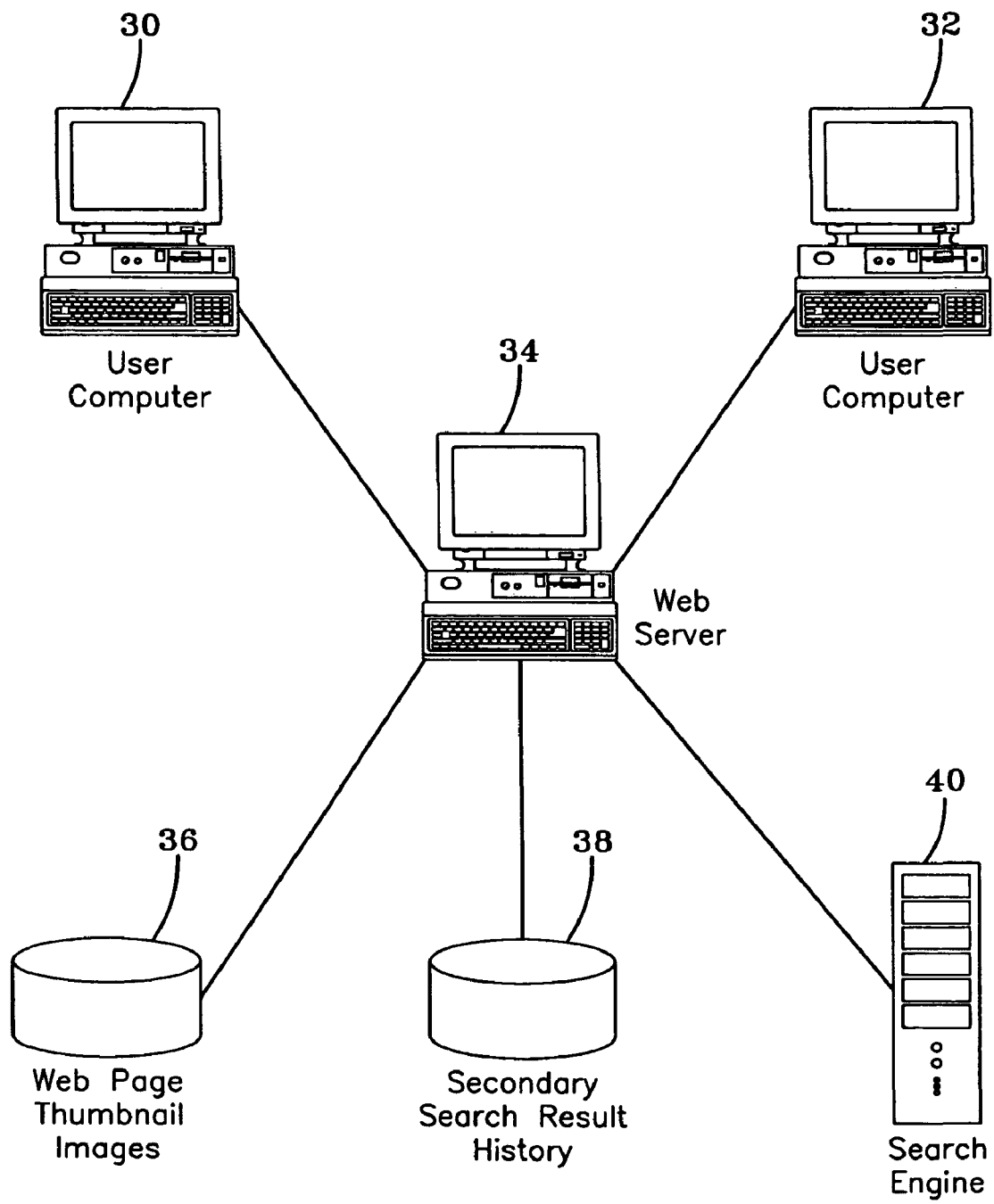
FIG. 8 is a block diagram of the primary components for an example embodiment of the present invention.

Referring to FIG. 8, the primary components for an example embodiment of the present invention are shown. The features and functionality of the present invention may be provided to a plurality of computer users 30, 32 by a web server 34 that obtains on behalf of the computer users 30, 32 search results from a search engine 40. The search engine 40 may be under the control of the web server 34 or it may be operated by a third party that provides the search results to the web server 34. The web server 34 may use the search engine results to locate corresponding web page thumbnail images that are contained in a database 36 accessible to the web server 34. The web server 34 retrieves the thumbnail images from the database 36 in order to present the search engine results to the user computers 30, 32 in accordance with the features and functionality of the present invention. A secondary search result history database 38 may be used to temporarily store secondary search results for computer users who select thumbnail images from the primary search results. Alternatively, the secondary search result history may be stored locally at each user computer 30, 32.

Although the example embodiment of the present invention is to be used in conjunction with an internet search engine, other embodiments are possible. In fact, the present invention could be used to navigate any type of digital information. The following possibilities are meant to be illustrative of different embodiments and are not intended to limit the scope of the invention due to possible embodiments not mentioned.

The present invention may be used to view news stories and headlines. For this embodiment the primary data set, analogous to the primary search results of the example embodiment, would consist of broad categories such as world news, national news, sports news, or weather. When a category from the primary data set is selected, an operational window appears in which specific news articles may be accessed. The articles that are accessed then comprise the secondary data set, analogous to the secondary search results of the example embodiment. The present invention may also be used in conjunction with encyclopedic information in a similar manner. The broad categories of information would comprise the primary data set. The user could explore these categories with the operational window, with the history of the operational window creating the secondary data sets.

The present invention may also be used in the sale of commercial goods. In such a situation the primary data set would consist of broad categories of products, such as appliances, electronics, clothing, etc. The operational window could then be used to view the specific products from each category of the primary data set. The products viewed by the user would then create the secondary data sets. Product and price comparison would be easily conducted by reviewing the secondary data sets.

While example embodiments of the invention have been illustrated and described, various modifications and combinations can be made without departing from the spirit and scope of the invention. Modifications, combinations, and equivalents to the system and method of the present invention are intended to be covered and claimed.

The invention claimed is:

1. A computer system for organizing, displaying, and navigating web search engine results, comprising:
   a web server with a web server application for locating a plurality of web pages responsive to a search request from a user;
   a user computer in communication with said web server for receiving from said web server at least a subset of said plurality of web pages responsive to said search request;
   a secondary search results database for storing web pages selected for viewing from said plurality of web pages response to said search request;
   a search results display window at said user computer comprising a primary search results section and a secondary search results section, wherein:
      (a) said primary search results section displays web pages from said plurality of web pages responsive to said search request and comprises a primary scrolling function for viewing said web pages in said primary search results section; and
      (b) said secondary search results section displays only web pages selected for viewing from said primary search results section of said search results display window and comprises a secondary scrolling function for viewing said web pages selected for viewing from said primary search results section;
   an operational window at said user computer independent of said search results display window for viewing and navigating individual web pages selected from said primary search results,
   wherein;
      (a) said individual web pages appear in said operational window when selected from said primary search results section;
      (b) said individual web page are added to said secondary search results database when selected from said primary search results section;
      (c) said individual web pages appear in said secondary search results section according to an order in which individual web pages are selected from said primary search results section for viewing in said operational window.

2. The computer system of claim 1, wherein said web pages are displayed in one or more horizontally aligned cells across said primary search results display section.

3. The computer system of claim 2, wherein said primary scrolling function shifts said web pages horizontally across said horizontally aligned cells.

4. The computer system of claim 3, wherein said individual web pages from said secondary search results are displayed in one or more cells aligned horizontally below said web pages in said primary search results section.

5. The computer system of claim 4, wherein said secondary scrolling function shifts said web pages in said secondary search results section horizontally across said horizontally aligned cells.

6. The computer system of claim 1, wherein said operational window is sized to allow a portion of said search results display window to appear while said operational window is navigated.

7. The computer system of claim 1, wherein said primary search results set comprises web page data from an electronic database selected from the group consisting of current events, consumer products available for purchase, or encyclopedic information.

8. The computer system of claim 1 wherein said web pages are displayed as thumbnail image in said search results display window.

9. The computer system of claim 1 wherein said web pages are displayed as URLs in said search results display window.

10. A method for presenting web search engine results at a user computer comprising:
   (a) receiving at a web server search criteria from a user computer;
   (b) identifying a plurality of web pages that match said search criteria from said user computer;
   (c) transmitting to said user computer data for said pages that match said search criteria from said user computer;
   (d) displaying in a first browser window at said user computer:
      (1) a primary search results section displaying only web pages from said plurality of web pages, said primary search results section comprising a primary scrolling function for viewing in said primary search results section web pages from said plurality of web pages; and
      (2) a secondary search results section displaying only web pages selected for viewing from said primary search results section, said secondary results section comprising a secondary scrolling function for viewing in said secondary search results web pages selected from said primary search results section;
   (e) displaying said web pages in said primary search results section of said first web browser window at said user computer;
   (f) displaying in a second web browser window at said user computer web pages selected at said user computer from said primary search results section of said first web browser window;
   (g) adding said selected web pages to a secondary search results database comprising only web pages selected from said primary search results section;
   (h) displaying said selected web pages in said secondary search results section of said first browser window at said user computer to create a history of web pages selected only from said primary search results section.

11. The method of claim 10 wherein said web pages are displayed in one or more horizontally aligned cells across said primary search results display section.

12. The method of claim 11 wherein said primary scrolling function shifts said web pages horizontally across said horizontally aligned cells.

13. The method of claim 12 wherein said individual web pages from said secondary search results are displayed in one or more cells aligned horizontally below said web pages in said primary search results section.

14. The method of claim 13 wherein said secondary scrolling function shifts said web pages in said secondary search results section horizontally across said horizontally aligned cells.

15. The method of claim 10 wherein said operational window is sized to allow a portion of said search results display window to appear while said operational window is navigated.

16. The method of claim 10 wherein said primary search results set comprises web page data from an electronic database selected from the group consisting of current events, consumer products available for purchase, or encyclopedic information.

17. The method of claim 10 wherein said web pages are displayed as thumbnail images in said search results display window.

18. The method of claim 10 wherein said web pages are displayed as URLs in said search results display window.

19. The method of claim 10 further comprising:
   (i) displaying at said user computer a plurality of advertisements selected according to said search criteria; and
   (j) replacing at least one of said plurality of advertisements displayed at said user computer in response to selection of a web page in said primary results section of said first browser window.

20. A method for reviewing web search engine results at a user computer comprising:
   (a) displaying at a user computer in a first portion of a first browser window images for a plurality of web pages that match search criteria from said user computer;
   (b) determining a user's selection from said first portion of a first one of said images for said plurality of web pages;
   (c) displaying at said user computer in a second portion of said first browser window said first one of said images while said first one of said images is displayed in said first portion of said first browser window;
   (d) displaying at said user computer in a second browser window a web page for said first one of said images to permit said user to navigate said web page;
   (e) determining said user's selection from said first portion of a second one of said images for said plurality of web pages;
   (f) displaying at said user computer in said second portion of said first browser window said first one of said images and said second one of said images while said second one of said images is displayed in said first portion of said first browser window; and
   (g) displaying at said user computer in said second browser window a web page for said second one of said images to permit said user to navigate said web page.

21. The method of claim 20 wherein said images are displayed in one or more horizontally aligned cells across said first and second portions of said first browser window.

22. The method of claim 21 wherein a primary scrolling function is used to shift said images horizontally across said horizontally aligned cells.

23. The method of claim 21 wherein said images in said second portion of said first browser window are displayed in one or more cells aligned horizontally below said images in said first portion.

24. The method of claim 20 wherein said second window is sized to allow a portion of said first browser window to appear while said second browser window is navigated.

25. The method of claim 20 wherein said plurality of web pages are from an electronic database selected from the group consisting of current events, consumer products available for purchase, or encyclopedic information.

26. The method of claim 20 further comprising:
   (h) determining said user's selection of an image from said second portion of said first browser window; and
   (i) displaying at said user computer in said second browser window a web page for said image to permit said user to navigate said web page.

27. The method of claim 20 further comprising:
   (h) displaying at said user computer a plurality of advertisements selected according to said search criteria; and
   (i) replacing at least one of said plurality of advertisements displayed at said user computer in response to selection of a web page in said primary results section of said first browser window.

* * * * *